(12) United States Patent
Barber et al.

(10) Patent No.: US 6,403,696 B1
(45) Date of Patent: Jun. 11, 2002

(54) FIBRIL-FILLED ELASTOMER COMPOSITIONS

(75) Inventors: James J. Barber, Arlington, MA (US); Carl Snyder, Silver Lake, OH (US)

(73) Assignee: Hyperion Catalysis International, Inc., Cambridge, MA (US)

(*) Notice: Subject to any disclaimer, the term of this patent is extended or adjusted under 35 U.S.C. 154(b) by 0 days.

(21) Appl. No.: 08/420,330

(22) Filed: Apr. 11, 1995

Related U.S. Application Data

(63) Continuation of application No. 08/129,807, filed on Sep. 30, 1993, now abandoned, which is a continuation-in-part of application No. 07/872,215, filed on Apr. 22, 1992, now Pat. No. 5,292,760, which is a continuation of application No. 07/386,828, filed on Jul. 27, 1989, now abandoned, which is a continuation-in-part of application No. 07/149,573, filed on Jan. 28, 1988, now abandoned.

(51) Int. Cl.$^7$ .............................. H01B 1/24; C08K 3/04
(52) U.S. Cl. ........................ 524/495; 524/496; 252/502; 252/511; 264/105
(58) Field of Search ................................ 252/502, 511; 264/105; 524/495, 496; 423/447.1, 447.3; 428/367, 368, 376, 398

(56) References Cited

U.S. PATENT DOCUMENTS

| | | | |
|---|---|---|---|
| 2,796,331 A | | 6/1957 | Kauffman et al. |
| 4,382,882 A | | 5/1983 | Vogel et al. |
| 4,461,719 A | | 7/1984 | Vogel et al. |
| 4,491,536 A | * | 1/1985 | Tomoda et al. ............. 252/511 |
| 4,525,147 A | | 6/1985 | Pitz et al. |
| 4,565,683 A | | 1/1986 | Yates et al. |
| 4,572,813 A | | 2/1986 | Arakawa et al. |
| 4,663,230 A | * | 5/1987 | Tennent ................. 923/445 R |
| 4,704,413 A | * | 11/1987 | Nabeta et al. ............. 252/511 |
| 4,748,436 A | | 5/1988 | Kanamori et al. |
| 4,816,289 A | | 3/1989 | Komatsu et al. |
| 4,855,091 A | * | 8/1989 | Geus et al. ............. 423/447.3 |
| 4,923,637 A | * | 5/1990 | Yagi et al. ................. 252/511 |
| 4,983,148 A | * | 1/1991 | Nakagawa ................. 252/511 |
| 5,098,771 A | * | 3/1992 | Friend .......................... 427/96 |
| 5,124,075 A | * | 6/1992 | Yasuda et al. ............. 252/511 |
| 5,165,909 A | * | 11/1992 | Tennent et al. .......... 423/447.3 |

FOREIGN PATENT DOCUMENTS

| | | |
|---|---|---|
| EP | 0198558 | 10/1986 |
| GB | 1469930 | 4/1977 |
| JP | 56088442 | 7/1981 |
| JP | 59152298 | 8/1984 |
| JP | 61132600 | 6/1986 |
| JP | 62505198 | 9/1987 |
| JP | 63280786 | 11/1988 |
| JP | 63286443 | 11/1988 |
| JP | 63286468 | 11/1988 |
| SU | 729211 | 4/1980 |
| SU | 925969 | 5/1982 |
| WO | 8701317 | 12/1987 |

OTHER PUBLICATIONS

Oberlin et al., *Journal of Crystal Growth*, vol. 32, pp 335–349, 1976.*
*The Condensed Chemical Dictionary*, 169, 426 (8th Ed. 1971).
"Beacon Gas–Conversion Process Yields Useful Carbon Materials" (R & D –1/87).
Endo, "Grow Carbon Fibers in the Vapor Phase", Chemtech, pp. 568–576 (9/88).
Tibbetts et al., SAMPE Journal (Sep./Oct. 1986), pp. 30–35.

* cited by examiner

*Primary Examiner*—Stuart L. Hendrickson
(74) *Attorney, Agent, or Firm*—Barry Evans, Esq.; Kramer Levin Naftalis & Frankel LLP

(57) ABSTRACT

A composite that includes an elastomer matrix into which carbon fibrils are incorporated. The fibrils are characterized as having a morphology consisting of tubes that are free of a continuous thermal carbon overcoat and have graphitic layers that are substantially parallel to the fibril axis, or as having a crystalline graphitic structure and a morphology defined by a fishbone-like arrangement of the graphite layers along the fibril axis.

6 Claims, No Drawings

FIBRIL-FILLED ELASTOMER COMPOSITIONS

This application is a continuation of application Ser. No. 08/129,807, filed Sep. 30,1993, now abandoned which is a continuation-in-part of Ser. No. 07/872,215, filed Apr. 22, 1992, now U.S. Pat. No. 5,292,760 which is a continuation of Ser. No. 07/386,828, filed on Jul. 27, 1989 now abandoned, which is a continuation-in-part of Ser. No. 07/149,573, filed on Jan. 28, 1998 now abandoned.

BACKGROUND OF THE INVENTION

This application is a continuation-in-part of Snyder et al., U.S. Ser. No. 149,573 entitled "Carbon Fibrils" filed Jan. 28, 1988, now abandoned which is a continuation-in-part of Tennent et al., U.S. Ser. No. 872,215 entitled Novel Carbon Fibrils, Method for Producing Same and Compositions Containing Same, filed Jun. 6, 1986, now abandoned, which is a continuation-in-part of Tennent, U.S. Ser. No. 678,701 entitled Carbon Fibrils, Method for Producing Same and Compositions Containing Same, filed Dec. 6, 1984, now U.S. Pat. No. 4,663,230 which are assigned to the same assignee as the present application and hereby incorporated by reference in their entirety.

This invention relates to elastomeric composites.

Elastomers have been filled with a variety of materials. Such materials are used to improve the mechanical or electrical properties of the elastomer matrix, or to reduce cost.

Carbon fibrils are carbon filaments having diameters less than 500 nanometers. Examples of particular carbon fibrils and methods for preparing them are described in the above-referenced Snyder et al. and Tennent et al. applications; and the Tennent patent as well as in Tennent et al., U.S. Ser. No. 871,676 filed Jun. 6, 1986 ("Novel Carbon Fibrils, Method for Producing Same and Compositions Containing Same"); Tennent et al., U.S. Ser. No. 871,675 filed Jun. 6, 1986 ("Novel Carbon Fibrils, Method for Producing Same and Encapsulated Catalyst"); Mandeville et al., U.S. Ser. No. 285,817 filed Dec. 16, 1988 ("Fibrils"); and McCarthy et al., U.S. Ser. No. 351,967 filed May 15, 1989 ("Surface Treatment of Carbon Microfibers"), all of which are assigned to the same assignee as the present application and are hereby incorporated by reference in their entirety.

SUMMARY OF THE INVENTION

In general, the invention features a composite in which carbon fibrils are incorporated in an elastomer matrix. In one aspect, the fibrils are characterized as having a morphology consisting of tubes that are free of a continuous thermal carbon overcoat (i.e. pyrolytically deposited carbon resulting from thermal cracking of the gas feed used to prepare the fibrils) and have graphitic layers that are substantially parallel to the fibril axis. One aspect of substantial parallelism is that the projection of the graphite layers on the fibril axis extends for a relatively long distance in terms of the external diameter of the fibril (e.g., at least two fibril diameters, preferably at least five diameters), as described in Snyder et al., U.S. Ser. No. 149,573. These fibrils preferably have diameters less than 100 nanometers, more preferably between 3.5 and 75 nanometers, inclusive, and a length to diameter ratio of between 5 and 100.

In a second aspect, the fibrils are characterized as having a crystalline graphitic structure and a morphology defined by a fishbone-like arrangement of the graphite layers along the fibril axis. Examples of such fibrils are described in the aforementioned Snyder et al., application, U.S. Ser. No. 149,573 and in Geus et al., European Application No. 0 198 558 published Oct. 22, 1986. These fibrils preferably have diameters less than 100 nanometers.

The amount of fibrils in the composite is preferably sufficiently high to permit curing of the composite by resistive or inductive heating or to permit at least one of the physical properties of the composite to be monitored electrically; preferably, this amount is less than 25 parts per 100 parts of elastomer, more preferably less than 10 parts per 100 parts of elastomer. In the case of masterbatches (i.e. fibril-filled elastomer precursors which are subsequently blended with additional elastomer in order to prepare the final composite structures), however, the amount of fibrils is preferably greater than 25 parts per 100 parts of elastomer.

Preferred elastomer matrices include natural rubber, styrene-butadiene rubber (both random and block copolymers), polyisoprene, neoprene, chloroprene, polybutadiene (both cis and trans 1,4 and 1,2-polybutadienes), fluoroelastomers (e.g., fluorinated polyethylene), silicone rubbers, and urethane elastomers. In addition to the fibrils, the elastomer preferably contains one or more fillers, e.g., carbon black, silica, or a combination thereof; the ratio of the amount of fibrils in the composite to the total amount of the fillers is at least 1:4 or better (e.g., 1:5, 1:6, etc.). The composites are preferably provided in the form of a tire or component thereof (e.g., tire tread or casing), seal, solution, or adhesive.

In a third aspect, the invention features a method for curing an elastomer that includes the steps of preparing a composite by incorporating carbon fibrils in an elastomer matrix, the amount of the fibrils being sufficient to impart to the composite an electrical conductivity sufficiently high to permit resistive or inductive heating, and heating the composite resistively or inductively to effect cure.

In a fourth aspect, the invention features a method for monitoring the physical condition of an elastomer that includes the steps of preparing a composite by incorporating an electrically conductive additive in an elastomer matrix, the amount of the additive being sufficient to impart to the composite an electrical conductivity sufficiently high to permit the physical condition of the elastomer to be monitored electrically, and monitoring the electrical properties (e.g., resistivity) of the composite as an indication of the physical condition of the elastomer. In a preferred embodiment of this aspect, the electrically conductive additive includes carbon fibrils. In another preferred embodiment, the composite is in the form of a tire and the the pressure inside the tire is monitored. The method is also preferably used to monitor an elastomer (e.g., in the form of a conveyor belt or hose) for the presence of rips, tears, or perforations.

In preferred embodiments of the third and fourth aspects, the amount of fibrils in the composite is less than 25 parts per 100 parts elastomer, more preferably less than 10 parts per 100 parts elastomer. Preferred fibrils are those described above.

In a fifth aspect, the invention features a method for preparing an elastomer composite that includes the steps of preparing a masterbatch by dispersing in an elastomer at least 25 parts of fibrils per 100 parts of elastomer, and compounding a predetermined portion of the masterbatch with an additional amount of an elastomer which may be the same as or different from the elastomer used to prepare the masterbatch) to prepare the composite. Preferably, the amount of fibrils in the final composite is less than 25 parts per 100 parts elastomer, more preferably less than 10 parts, Preferred fibrils are as described above. Carbon black may also be added to the composite, either during preparation of the masterbatch or during the compounding step.

In a sixth aspect, the invention features a method for reinforcing an elastomer that includes incorporating into an elastomer matrix an amount of carbon fibrils sufficient to improve the mechanical properties of the elastomer. The fibrils are as described above for the first and second aspects of the invention.

The invention provides fibril-reinforced elastomer composites exhibiting good stiffness, tensile strength, tear strength, creep and die swell resistance, and green strength (i.e. strength prior to cure). The composites also exhibit good hardness, stress-strain properties, and abrasion resistance (even with relatively soft elastomer matrices), and have low specific gravity. The improved abrasion resistance makes it possible to achieve an advantageous balance of traction, rolling resistance, and tread wear in articles fabricated from the composites. Moreover, these advantages are achieved at low fibril loadings.

Further advantages result from the electrical properties of the fibrils. Because the fibrils are electrically conductive, they can be used to perform the dual functions of reinforcing an elastomer matrix and at the same time rendering the matrix electrically conductive. The electrically conductive composites can be cured by resistive or inductive heating, thus avoiding the problems of thermal transfer and high cost often associated with conventional heat curing. The ability to be cured electrically makes the fibril-filled composites particularly useful as adhesives in a variety of bonding operations such as forming rubber-rubber bonds (e.g., in bonding tire treads to tire casings), rubber-metal bonds, and rubber-ceramic bonds, and in rubber repair systems for products such as tires and conveyor belts.

The electrical conductivity of the composites is also useful in applications such as the extrusion of rubber tubes, treads, and related products. In addition, the composites can be partially electrically cured to impart additional dimensional stability to the composite. The invention also makes possible the design products in which physical changes in the composite such as internal pressure can be monitored electrically. For example, the state of a tire, air spring, hose, or conveyor belt can be monitored simply and effectively.

Other features and advantages of the invention will be apparent from the following description of the preferred embodiments thereof, and from the claims.

DESCRIPTION OF THE PREFERRED EMBODIMENTS

The composites are prepared by dispersing fibrils in an elastomer matrix. Preferred fibrils have small diameters (preferably between 3.5 and 75 nanometers), graphitic layers that are substantially parallel to the fibril axis, and are substantially free of a continuous thermal carbon overcoat, as described in Tennent, U.S. Pat. No. 4,663,230; Tennent et al.; U.S. Ser. No. 871,675; Tennent et al., U.S. Ser. No. 871,676; Snyder et al., U.S. Ser. No. 149,573; and Mandeville et al., U.S. Ser. No. 285,817. These fibrils are prepared as described in the aforementioned patent and patent applications. The fibrils may also be treated to introduce oxygen-containing functional groups onto the fibril surface, as described in McCarthy et al., U.S. Ser. No. 351,967. Preferred elastomer matrices include natural rubber, styrene-butadiene rubber (both random and block copolymers), polyisoprene, neoprene, chloroprene, polybutadiene (both cis and trans 1,4 and 1,2-polybutadienes), fluoroelastomers (e.g., fluorinated polyethylene), silicone rubbers, and urethane elastomers (e.g., Spandex).

Low fibril loadings are preferred. In general, between 1 and 10 parts of fibrils are added per 100 parts elastomer. Fillers such as carbon black and silica may also be added; preferably, four parts filler are used for every one part fibrils.

The particular compounding method used to prepare the fibril-filled elastomer composites depends on the end property sought, the type of elastomer matrix, the degree of dispersion required, and the type of fillers added in addition to the fibrils. For example, in rubber matrices such as natural rubber which have a significant measure of strength even in the absence of any separately added reinforcing agents, conventional compounding equipment such as Banbury and two-roll mills can be used to prepare the composite. Where a high degree of uniform dispersion is desired, however, the fibrils are first broken up using techniques such as ball-milling. A particularly effective method for achieving well-dispersed mixtures involves combining the fibrils, elastomer matrix, and any other fillers with a low viscosity additive (e.g., an oil or liquid solvent) and a milling promoter (e.g., abrasive particles) to form a slurry, and then agitating that slurry at high speeds in, e.g., a stirred ball mill or attritor, as described in Creehan, U.S. Ser. No. 07/386,912, entitled "Process for Preparing Composite Structures", filed concurrently with the present application which is hereby incorporated by reference in its entirety. The viscosity modifier may also be built into the matrix, e.g., in the case of solution polymerized SBR. Once agitation is complete, any solvents can be removed by, e.g., vacuum drying, steam stripping, or freeze drying. The mixtures can then be molded as is or subjected to further high shear compounding in, e.g., the Banbury or two-roll mill and then molded.

During compounding, the amount of fibrils may be chosen so as to match the desired amount of fibrils in the final composite and added directly to the elastomer matrix. However, the fibril-filled composites may also be prepared by first combining a high (25 parts) amount of fibrils with the elastomer to form a masterbatch. An appropriate amount of the masterbatch designed to achieve the targeted amount of fibrils in the final composite (e.g., 5–10 parts) is then compounded with additional elastomer as described above to form the final composite.

The composites can be molded by application of heat or by resistive or inductive heating into a variety of articles using conventional elastomer molding techniques. Particularly useful articles include tires and tire components such as treads and casings, seals, and vibration damping agents. The uncured composites are useful as as adhesives and bonding agents, e.g., as repair compounds for tires and conveyors. The adhesive can be cured in place by inductive or resistive heating. The physical properties of articles prepared from the fibril-filled elastomers (e.g., the air pressure of a tire) can be monitored electrically.

Other embodiments are within the following claims.

For example, fibrils having a crystalline graphitic structure and a morphology defined by a fishbone-like arrangement of the graphite layers along the fibril axis, as described in Geus et al., European Patent Application No. 0 198 558, published Oct. 22, 1986, are also suitable. These fibrils are prepared by vapor phase deposition of hydrocarbon gas onto a monocrystalline metal particle catalyst (e.g., iron) having a diameter of at least 5 nm at temperatures between 250 and 800° C.

What is claimed is:

1. A method for preparing an elastomer composite comprising the steps of:

preparing a masterbatch by dispersing in an elastomer at least 25 parts of carbon fibrils per 100 parts of elastomer to enhance the mechanical properties of said elastomer;

wherein said fibrils are:
   a. fibrils characterized as having a morphology consisting of tubes that are free of a continuous thermal carbon overcoat and having graphitic layers that are substantially parallel to the fibril axis, wherein said fibrils have a diameter less than about 100 nanometers and a length less than about 10,000 nanometers, or
   b. fibrils characterized as having a crystalline graphitic structure and a morphology defined by a herring bone arrangement of the graphite layers along the fibril axis, wherein said fibrils have a diameter less than about 100 nanometers and the length to diameter ratio is between 5 and 100; and compounding a portion of said masterbatch with an additional amount of an elastomer to prepare said composite.

2. The method of claim 1 furthering comprising incorporating carbon black into said composite.

3. The method of claim 1, wherein the diameter of said fibrils is between 3.5 and 75 nanometers, inclusive.

4. The method of claim 1 wherein said fibrils are substantially free of a continuous thermal carbon overcoat.

5. The method of claim 1 wherein the amount of fibrils in said composite is greater than 0 and less than 25 parts per 100 parts elastomer.

6. The method of claim 5 wherein the amount of fibrils in said composite is greater than 0 and less than 10 parts per 100 parts of elastomer.

* * * * *